(No Model.) 2 Sheets—Sheet 2.
G. HOFFMANN.
POTATO PLANTING MACHINE.
No. 491,887. Patented Feb. 14, 1893.
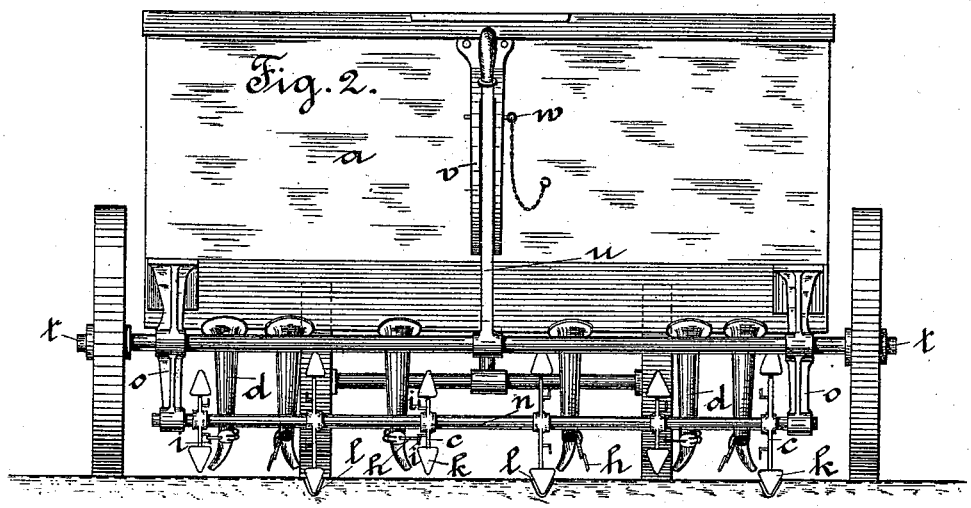
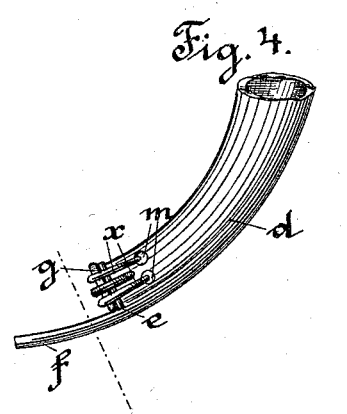
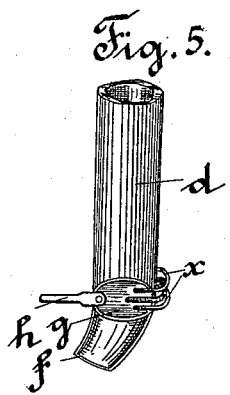
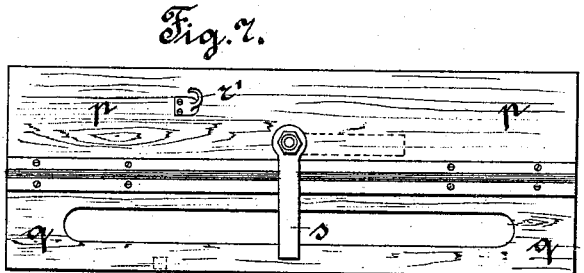

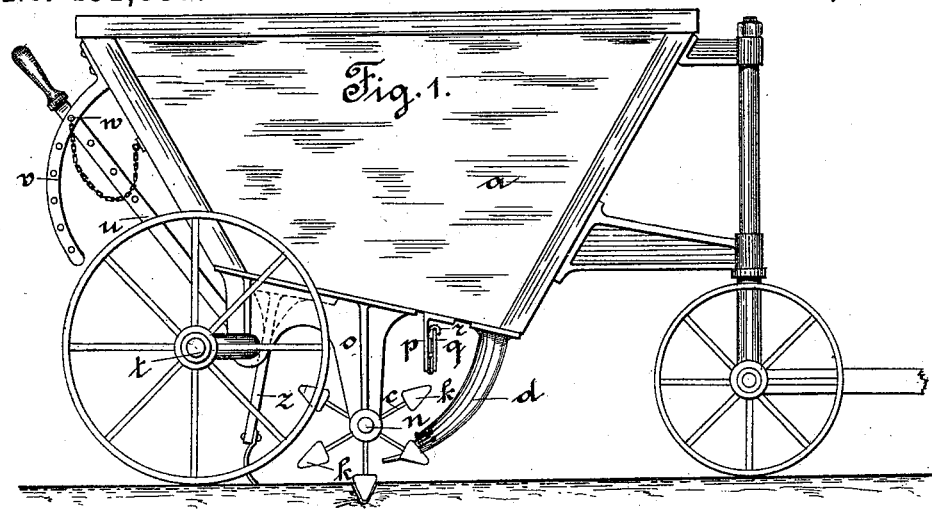

UNITED STATES PATENT OFFICE.

GUSTAV HOFFMANN, OF TISCHDORF, GERMANY.

POTATO-PLANTING MACHINE.

SPECIFICATION forming part of Letters Patent No. 491,887, dated February 14, 1893.

Application filed September 23, 1892. Serial No. 446,709. (No model.)

*To all whom it may concern:*

Be it known that I, GUSTAV HOFFMANN, of Tischdorf, in the Province of Posen and Kingdom of Prussia, Germany, have invented new and useful Improvements in Potato-Planting Machines, of which the following is a specification, reference being had therein to the accompanying drawings.

The following invention relates to a potato planting machine which combines simplicity of construction and easy manipulation.

Figure 1 is a side view, Fig. 2 a rear view of the whole machine, Fig. 3 is a horizontal section through the potato hopper or holder. Fig. 4 is a detail side view of one of the feed tubes, Fig. 5, is a detail rear view thereof, and Fig. 6 a detail view of the lower end of the same. Fig. 7 is a detail front elevation of the brake mechanism for the digger blades and Fig. 8 is a detail side elevation thereof.

The frame $o$ situated underneath the hopper $a$ has a shaft $n$ passing through it upon which are fixed six or other suitable number of sets of radiating hole diggers $k$. In the progress of the machine the shaft $n$ is so made to revolve that each digger makes a hole $l$ in the ground. Close to the diggers the feed tubes $d$ are situated and are in communication with the potato hopper or reservoir $a$, see Figs. 1, 2 and 3.

The outlet $e$ of the tube $d$ is provided with a hinged lid $g$ which is normally kept closed by spring pressure and carries a striking pin $h$. Each of the arms of the digger carries a hook formed projection $i$ which in passing by the tube $d$ strikes the pin $h$ and opens the lid $g$ for the moment so that by means of the open spout continuation $f$ a potato rolls into the hole just made. The falling of more than one potato upon the opening of the lid $g$ is prevented by two half circle or crescent shaped pins $x$, which upon the turning of the lid $g$ enter through the openings $m$ into the interior of $d$.

In order to produce at pleasure a larger or smaller planting hole and to be able to bring the digger quite out of contact with the ground the rear wheel axle $t$ is bent angularly or cranked.

The hand lever N which is held in position by a lock pin $w$ determines the position of the angle shaft and at the same time also the height of the frame above the ground.

When not in use the hole digging blades $k$ are held fast by a brake apparatus consisting of the two boards $p$ and $q$ connected by hinges which are made rigid by the bolts $s$. When $q$ is folded upon the board $p$ $p$ and fastened by a chain $r$ the rotation of blades $k$ is unhindered.

The covering over of the planted potatoes is effected by means of a following plow-share $z$ fastened to the frame of the carriage [Fig. 1].

What I claim and desire to secure by Letters Patent of the United States is:

A potato planting machine having a horizontal shaft $n$ with hole digger $k$ thereon together with the feeding tubes $d$ the hinged lid $g$ which on being struck is momentarily opened whereupon the hook formed pins $x$ $x$ seated on the hinged lid $g$ pass into the interior of the feeding tubes in order to prevent the falling of more than one seed potato at a time substantially in the manner and for the purposes hereinbefore described.

In witness whereof I have hereunto set my hand in presence of two witnesses.

GUSTAV HOFFMANN.

Witnesses:
   PAUL FISCHER,
   PAUL BRINKMANN.